(12) United States Patent
Lafon

(10) Patent No.: US 7,119,845 B2
(45) Date of Patent: Oct. 10, 2006

(54) IMAGE RESIZING SYSTEM AND METHOD

(75) Inventor: Philippe Lafon, Cagnes sur Mer (FR)

(73) Assignee: Texas Instruments Incorporated, Dallas, TX (US)

( * ) Notice: Subject to any disclaimer, the term of this patent is extended or adjusted under 35 U.S.C. 154(b) by 516 days.

(21) Appl. No.: 10/268,391

(22) Filed: Oct. 10, 2002

(65) Prior Publication Data

US 2003/0122960 A1 Jul. 3, 2003

(30) Foreign Application Priority Data

Oct. 10, 2001 (EP) ................................. 01402611

(51) Int. Cl.
*H04N 7/01* (2006.01)
*H04N 9/74* (2006.01)
(52) U.S. Cl. ...................... 348/441; 348/581
(58) Field of Classification Search ................ 348/441, 348/445, 446, 448, 458, 459, 581; 341/61; 382/298; H04N 7/01, 11/20, 9/74
See application file for complete search history.

(56) References Cited

U.S. PATENT DOCUMENTS

| 5,274,372 | A | * | 12/1993 | Luthra et al. ................. 341/61 |
| 5,963,261 | A | * | 10/1999 | Dean .......................... 348/446 |
| 6,724,826 | B1 | * | 4/2004 | Varian ................... 375/240.29 |
| 6,765,622 | B1 | * | 7/2004 | Rathnam et al. ............ 348/581 |
| 6,894,725 | B1 | * | 5/2005 | Hutchinson et al. ........ 348/441 |
| 6,970,204 | B1 | * | 11/2005 | Aida et al. .................. 348/441 |

* cited by examiner

*Primary Examiner*—Sherrie Hsia
(74) *Attorney, Agent, or Firm*—Carlton H. Hoel; W. James Brady, III; Frederick J. Telecky, Jr.

(57) ABSTRACT

Image resizing through resampling by poly-phase filtering with a phase generation from input parameters but with lower resolution of the phase for filter selection. Field and frame mode selection creates initial offsets for alignment. A phase accumulator generates sample addressing with its most significant bits, generates filter selection with its middle bits, and maintains its least significant bits for accuracy.

5 Claims, 6 Drawing Sheets

IMAGE RESIZING SYSTEM AND METHOD

CROSS-REFERENCE TO RELATED APPLICATIONS

This application claims priority from European patent application number 01402611.6 filed Oct. 10, 2001.

BACKGROUND OF THE INVENTION

The invention relates to digital image processing, and more particularly to image resampling methods and circuitry.

Modern digital video systems typically require resolution conversion capability for applications such as displaying HDTV signals at standard TV resolution, zooming, decimating, and providing picture-in-picture display. Poly-phase filtering allows accurate constant resampling ratios and may use predefined state machines to control pixel input pipelining and filter coefficient addressing according to predefined phase sequences. However, such filters are not flexible enough because they require adaptation each time a new conversion ratio is needed by a new application. Also, new video environment applications require new process capabilities such as frame rate conversions and play speed control. Those applications involve spatial field or frame interpolation capabilities that are usually offered with only a fixed number of predefined ratios, and this hinders vertical filtering.

Adams et al, A Monolithic Asynchronous Sample-Rate Converter for Digital Audio, ISCAS '93, pp. 1963–1966 (1993), disclose an integrated circuit providing audio sampling rate conversion with feedback tracking of the timing of output sample requests. This also shows experimental results for an input sampling rate of 48 KHz converted to an output sampling rate of 44.1 KHz.

SUMMARY OF THE INVENTION

The present invention provides image and video resampling with an output phase accumulator driving input sample/line fetch plus filter coefficient selection.

This has advantages including simple implementation of field/frame modes of line resampling, of image panning, and/or of adaptation of resampling filtering method to the resampling ratio.

BRIEF DESCRIPTION OF THE DRAWINGS

The drawings are heuristic for clarity.

DETAILED DESCRIPTION OF THE PREFERRED EMBODIMENTS

1. Overview

Figure 1A:
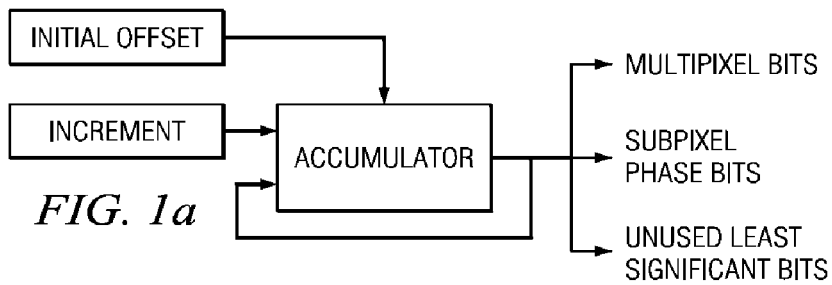
FIGS. 1a–1e illustrates a first preferred embodiment resampling system and resampling.
Figure 1B:
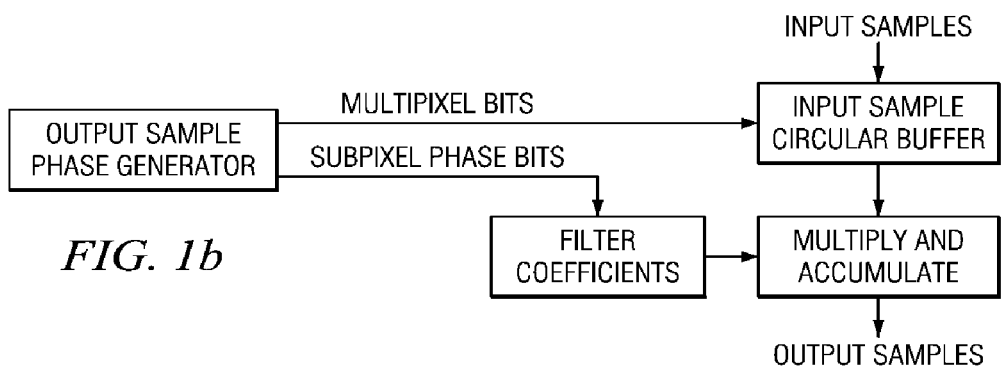
Figure 1C:
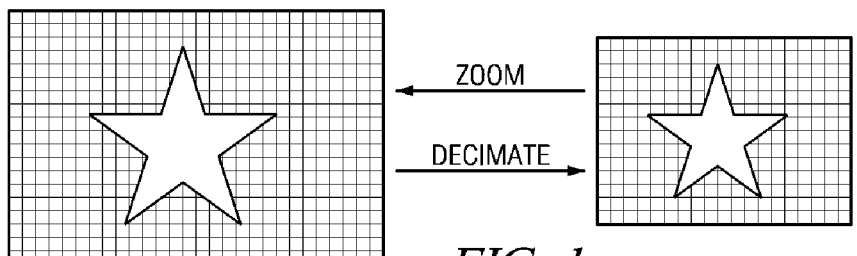

Preferred embodiment image/video resampling (resizing, rescaling) methods utilize a phase synthesis for output samples (pixel values) within a line plus phase synthesis for output lines (rows) which provides both input sample or line fetch control (integer part of the phase) plus poly-phase filter coefficient set selection (higher order bits of the fractional part of the phase). The resampling may select from different filtering approaches (linear, bilinear, etc.), and the phases are quantized to select corresponding poly-phase filters to simplify the filtering. FIG. 1a illustrates a phase synthesis circuit which includes initial offset capability for features such as panning and field/frame resampling. FIG. 1b shows the overall system including phase synthesis generator, input sample memory, and filtering to yield output samples. FIG. 1c shows image resampling: if the left image is the input and the right image is the output, then the resampling is a decimation of about 1.5 to 1; whereas, if the right image is the input and the left image is the output, then the resampling is a zoom by a factor of about 1.5. Note that the number of pixels changes, the image size changes, the number of pixels within the image changes, but the size/spacing of the pixels remains constant (and depends only on the display device).

The preferred embodiment systems thus have one or more of the following advantages: (1) control of interpixel scannings in resampling from field to field, field to frame, frame to field, and frame to frame formats (to adapt the incoming video nature to the output display device); (2) resampling phase synthesis with higher resolution than used for poly-phase filter selection to maintain phase accuracy among the picture; (3) adaptation (for simplified decimation) to bilinear filtering and hybrid equations; and (4) starting phase initialization for features such as horizontal and/or vertical panning.

Preferred embodiment systems include preferred embodiment image resampling methods which may be invoked prior to or after other encoding or decoding, such as MPEG or JPEG (de)compressions, for video and still images.

Figure 1D:
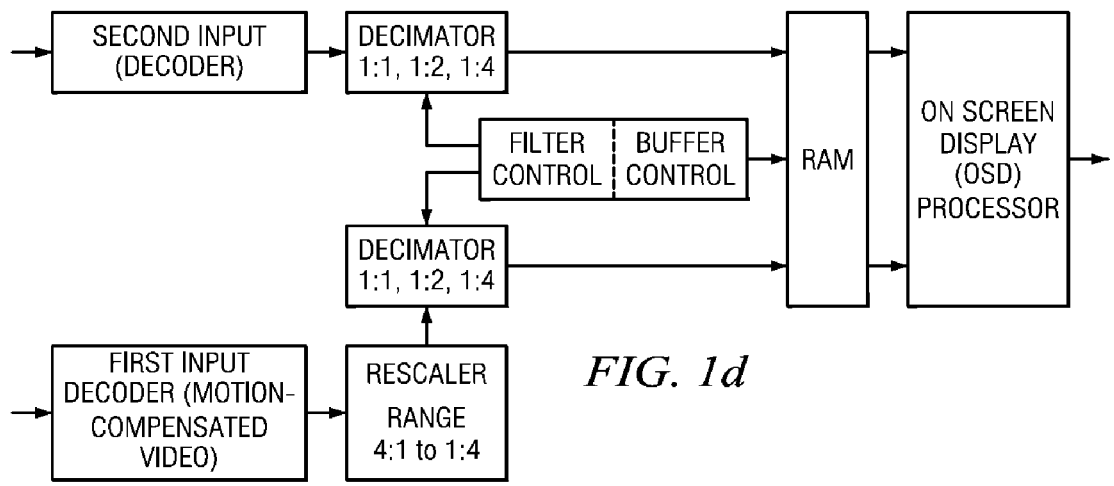
Figure 4A:
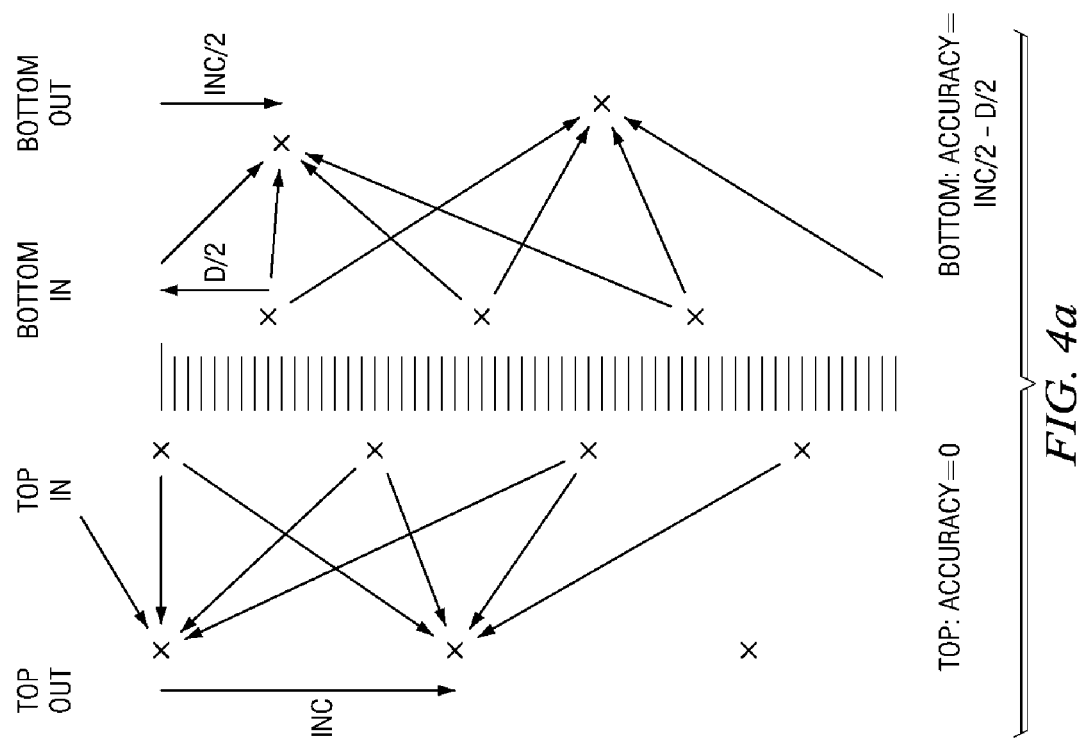
FIGS. 4a–4e show preferred embodiment resampling categories.
Figure 1E:
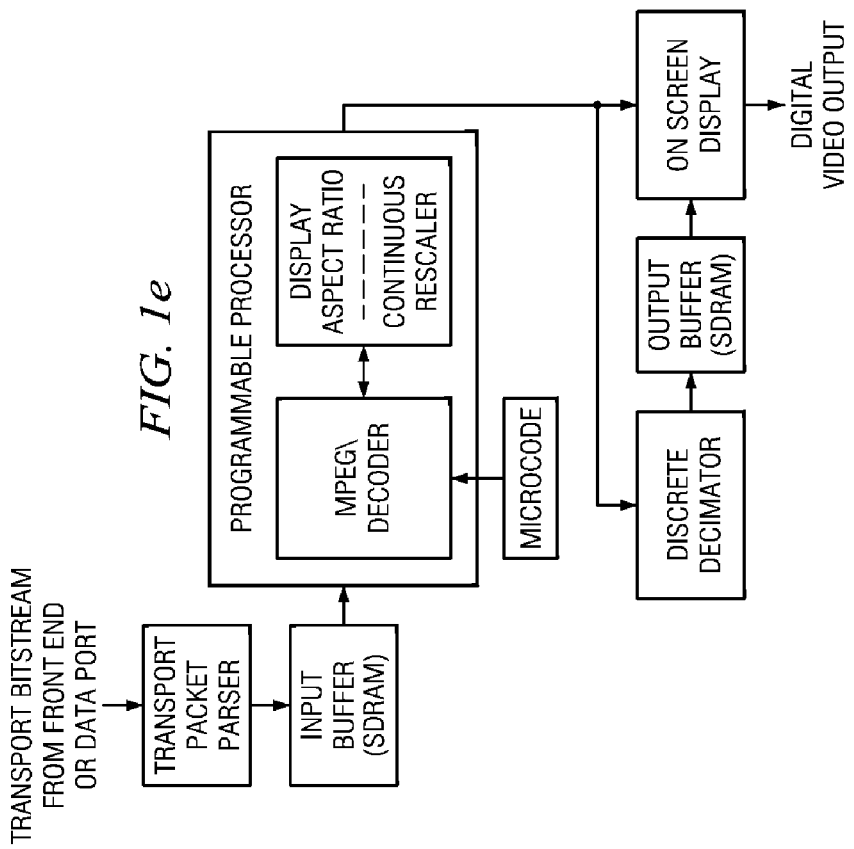

FIGS. 1d–1e illustrate video display systems which include a preferred embodiment type resampler (resizer, rescaler). In particular, the system has a motion compensated video (e.g., MPEG) decoder; a rescaler of the foregoing type which provides resamplings in the range from zooms of 4 to 1 to decimations of 1 to 4; a discrete decimator with fixed-ratio resamplings of 1 to 1, 1 to 2, and 1 to 4; a second input for picture-in-picture or windows type image combinations using a second discrete decimator with fixed-ratio resamplings; a memory; and an OSD (on screen display) processor for the picture-in-picture (windows) display blending from the two inputs. The combination of the rescaler providing resamplings in the range 4:1 to 1:4 with the discrete decimator allows for overall resamplings in the range 4:1 to 1:16 for the first input.

Additionally, converters between YUV and RGB (or other) formats may be included. Plus display aspect ratio management (resizing) may be affiliated with the resealing to provide adjustments between input and output formats such as 4×3, 16×9, and 20×9 formats. For example, the display aspect ratio management may include horizontal cropping (pan & scan) and letter box (top and bottom non-image bars insertion) to make 16×9 input fit on a 4×3 monitor.

The resampling computations can be performed with digital signal processors (DSPs) or general purpose or specialized programmable processors or application specific circuitry or systems on a chip with mutliple processors and functionalities such as a system with RISC controller processor plus a DSP and/or specialized processors/accelerators for computation intensive functions such as the filterings. A stored program in an onboard or external ROM, flash EEPROM, or ferroelectric RAM for a DSP or programmable processor could, in part, be dynamically loaded for configuration. Analog-to-digital converters and digital-to-analog converters provide coupling to the real world, and modulators and demodulators (plus antennas for air interfaces) provide coupling for transmission waveforms. The input image/video can be packetized and transmitted over networks such as the Internet. The system of FIG. 1e illustrates a transport packet parser to separate out the video from other (e.g., audio) information within packets.

2. First Preferred Embodiment

FIG. 1a illustrates a first preferred embodiment phase synthesis circuit which drives both memory fetches of input samples and filter coefficients to compute output samples as shown in FIG. 1b. For resampling an image or video stream, the system of FIGS. 1a–1b first resamples each row of pixels (line) and then resamples the set of lines. The system operates to resample a row of pixels as follows. First, subdivide the distance (phase) between successive input samples (pixel values) into D steps; D relates to the normalized distance between each sample and, for example, may be taken equal to 1024 ($=2^{10}$). Next, for resampling a row of N pixels into a row of N' pixels, define an increment, INC, equal to (rounded off) D*N/N'; INC is the number of phase steps between successive output samples. INC may be larger than D (as for decimation) or smaller than D (as for zoom) or equal to D (as for a pan). Also, INC could vary within an image for special effects.

Then compute the phase of the next output sample using the accumulator of FIG. 1a; the accumulator width is $\log_2 D + \log_2 S$ bits (e.g., 14 bits) where S is the size of the circular input sample buffer and is taken to be a power of 2 (e.g., $2^4=16$). Of course, S must be at least as large as the largest number of filter taps of the filterings and also must be at least as large as the maximum decimation rate. With this size accumulator, the accumulator overflow just matches the address overflow of the input buffer, and the highest $\log_2 S$ bits (e.g, 4 bits) from the accumulator directly address the starting point in the input buffer for the resampling filtering computations. And a few bits (e.g., 5 bits) of the most significant of the lowest $\log_2 D$ bits (e.g., 10 bits) of the accumulator select the set of filter coefficients. This use of only a subset of the lower accumulator bits limits the number of sets of filter coefficients that must be stored without a significant degradation in quality.

More explicitly, consider examples of an image zoom and an image decimation. As a zoom example, presume the input line of samples $X(0), X(1), \ldots, X(99)$ is to be zoomed by a factor of 1.78 to yield the output line of samples $Y(0), Y(1), \ldots, Y(177)$. (Filter width at the image boundary frequently requires some padding to define samples such as $X(-1)$ and $X(100)$.) Take the circular input sample buffer size S=16, the input sample distance D=1024, and 5-bit filter coefficient selection. This D yields INC=575, and the FIG. 1a circuit has a 14-bit accumulator which generates the Y( ) phases (expressed as 1024*multipixel+32*subpixel-phase+least significant):

$Y(0)$phase=0=0*1024+0*32+0

$Y(1)$phase=575=0*1024+17*32+31

$Y(2)$phase=1150=1*1024+3*32+30

$Y(3)$phase=1725=1*1024+21*32+29

$Y(4)$phase=2300=2*1024+7*32+28

$Y(5)$phase=2875=2*1024+25*32+27

. . .

$Y(28)$phase=16100=15*1024+23*32+4

$Y(29)$phase=16675(=16*1024+9*32+23;
    so overflow)=311=0*1024+9*32+23

$Y(30)$phase=886=0*1024+27*32+22

. . .

Thus accumulator least significant bits [0:4] are not used for addressing but are needed to maintain accumulator accuracy, subpixel phase bits [5:9] select the set of filter coefficients, and multipixel bits [10:13] address the circular input sample buffer. As a simple filter example, consider a bilinear filter with coefficients $C_0$ for $X(n)$ and $C_1$ for $X(n+1)$ where $X(n)$ is the sample addressed by accumulator bits [10:13]. Thus $Y(n)=C_0*X(n)+C_1*X(n+1)$ with the following sets of filter coefficients:

| bits [5:9] | $C_0$ | $C_1$ |
|---|---|---|
| 0 | 1 | 0 |
| 1 | 31/32 | 1/32 |
| . . . | | |
| 15 | 17/32 | 15/32 |
| 16 | 1/2 | 1/2 |
| 17 | 15/32 | 17/32 |
| . . . | | |
| 31 | 1/32 | 31/32 |

Hence, $Y(0)=X(0)$ $Y(1)=15*X(0)/32+17*X(1)/32$ $Y(2)=29*X(1)/32+3*X(2)/32$ $Y(3)=11*X(1)/32+21*X(2)/32$ $Y(4)=25*X(2)/32+7*X(3)/32$ $Y(5)=7*X(2)/32+25*X(3)/32$

. . .

$Y(28)=9*X(15)/32+23*X(16)/32$ $Y(29)=23*X(16)/32+9*X(17)/32$ $Y(30)=5*X(16)/32+27*X(17)/32$

. . .

And after the foregoing horizontal resamplings within the lines, vertically resample the lines in the same manner with X( ) representing the input lines and Y( ) the output lines. That is, an output line Y( ) has samples which are vertical filterings of corresponding samples of the input lines X( ). Thus if the original image had 100 lines with each line containing 100 samples, first the foregoing horizontal resampling of the lines would generate 100 input lines for vertical resampling with each resampled line containing 178 samples; then the vertical resampling would generate 178 lines with each output line still containing 178 samples. Compute the 178 samples per output line as 178 vertical filterings using the corresponding samples of the 100 input 178-sample lines.

Further, the horizontal and vertical resamplings can be interleaved: after a horizontal resampling of samples within a line, one or more vertical line resamplings (for a zoom) may be performed. In this manner the resampled (resized) image can be displayed in raster scan order as it is being resampled. And for real-time operation the output samples are generated at an overall rate $(1.78)^2$ times the incoming input sample rate. Also, the vertical and horizontal resampling (resizing) factors may differ.

Similarly for a simple decimation example presume input samples $X(0), X(1), \ldots X(299)$ are to be decimated by a factor of 3 to yield the output samples $Y(0), Y(1), \ldots Y(99)$. Again taking S=16 and D=1024 yields INC=3072, so the FIG. 1a circuit generates the Y( ) phases:

$Y(0)$phase=0=0*1024+0*32+0

$Y(1)$phase=3072=3*1024+0*32+0

$Y(2)$phase=6144=6*1024+0*32+0

$Y(5)$phase=15360=15*1024+0*32+0

$Y(6)$phase=18432(=18*1024+0*32+0;
    so overflow)=2048=2*1024+0*32+0

. . .

For this integer decimation the same filter coefficients are used for all filterings because the accumulator bits [5:9] remain constant (all 0's). With an initial offset, the bits [5:9] will still remain constant, although not necessarily all 0's, and the filter coefficients again remain the same for all filterings.

Again, after resampling within each line, resample the set of lines.

3. Second Preferred Embodiments

Figure 2:
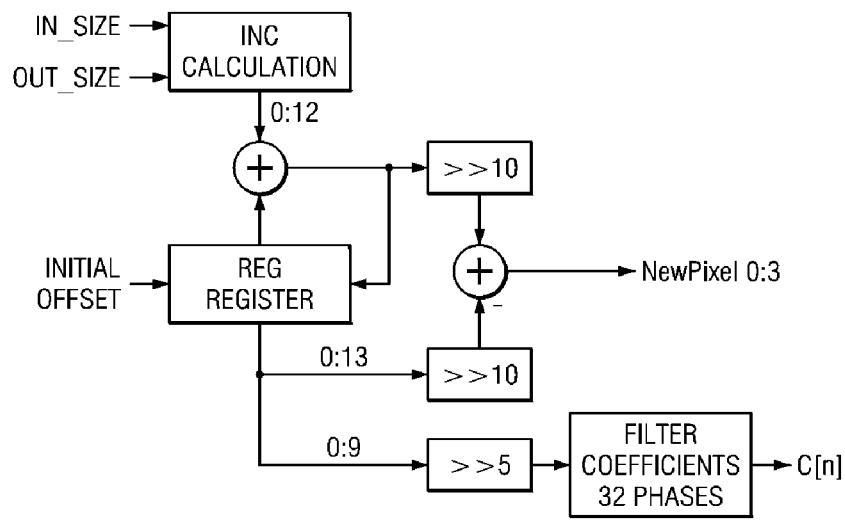
FIG. 2 shows a second preferred embodiment.

FIG. 2 illustrates second preferred embodiment image resampling system and method which is analogous to that illustrated in FIGS. 1a–1b; indeed, FIG. 2 implements the case of D=1024 and 32 poly-phase filters together with the accumulator of FIG. 1a as a register (REG) plus adder. The method includes horizontal resampling for each line (row) of pixels and vertical resampling of the lines, including interlaced or progressive frames, with the following steps (which omit description of action at accumulator overflow plus fetch samples for pipelined filtering):

(a) select an input pixel distance normalization, D, such as 1024, which typically will be on the order of horizontal or vertical size of the image and represent the number of phase steps between input samples (pixel values).

(b) select an output increment, INC, to be approximately D times the resampling ratio, so INC will be the number of phase steps between output pixels:

INC=((D*IN_SIZE)+(OUT_SIZE)/2)/OUT_SIZE where IN_SIZE in the number of input samples and OUT_SIZE is the number of output samples in a row (horizontal resampling) or a column (vertical resampling). The variables are all integers, so OUT_SIZE/2 provides roundoff. Note that for zooms INC will be less than D (so more pixels are output than input), whereas for decimations (compressions) INC will be larger than D; and that special effects may vary INC within a line.

(c) select an initial offset in terms of phase steps (fraction of a pixel difference offset multiplied by D) and initialize the register with this value:

REG=initial offset

Effects such as horizontal panning trivially resample (by a factor of 1) an image but more importantly shift the starting point of each line with the initial offset.

(d) generate the output samples in a line (row of pixels) with the following filtering loop, the input samples are pipelined with in[k] the kth entry in the pipeline. Note the center tap of the filter is C[0], and the output phase multipixel part fetched the in[0] sample in the pipeline.

```
do
{   Get_coef_C( REG[i:j] ); //filter coefficients using middle REG bits
    out = C[-n]*in[-n] + . . . +C[0]*in[0] + . . . + C[n]*in[n]; //filtering
    out /= filter_gain;
    NewPixel = ((REG+INC)/D) – (REG/D); //test variable for new input
    REG += INC; //update output line phase
    while(NewPixel--) input_next_pixel( ); //new input sample(s)
    in[-n] <= . . . <= in[0] <= . . . <= in[n] <= *(pixel++);
        //input next sample plus shift in pipeline
} while(output samples remaining);
```

Thus the output sample phase (REG) is partitioned into three sets of bits: (1) the integer part of REG/D (and integer part of (REG+INC)/D) used to determine whether new input samples are needed, (2) the upper bits of the fractional part of REG/D, denoted REG[i:j] used to select the filter coefficients, and (3) the lower bits of the fractional part of REG/D which only accumulate.

(e) select the scanning and interpolation mode for line resampling (vertical resampling). Both Video and Display device may be either in field scanned mode (interlaced) or frame scanned mode (progressive). Field scanned is the typical display in video; each field is scanned individually and sequentially to preserve the temporal coherency of the signal. The vertical resampling filtering can be considered to fall into one of four categories of scanning:

(i) field input scanning TO field output scanning; (usual interlaced video with usual monitor device).

(ii) field input scanning TO frame output scanning; (usual interlaced video with progressive display device such as LCD . . . ).

(iii) frame input scanning TO field output scanning; (usual progressive video such as movies with usual monitor device).

(iv) frame input scanning TO frame output scanning; usual progressive video such as movies with progressive display device such as LCD . . . ).

The second preferred embodiment then applies filtering according to the resampling RANGE, for example, with a range from zoom by 8 to decimation by 8. Full band pass filter may be used for ANY zooming ratio while filter adaptation is required depending on the decimation ratio. Optionally the device allows bilinear interpolation which uses only two nearest lines because this simplification (i.e., only 2 filter taps) provides acceptable quality without impacting the video burst bandwidth, for high decimation ratios (for example above decimation 2:1). In fact, using the bilinear interpolation method allows any ratio of vertical decimation at constant bandwidth.

Because fields may be either TOP or BOTTOM (consisting of even numbered lines/rows of pixels or odd numbered lines/rows of pixels, respectively) which differ in a sense of relative vertical positioning from each other, the preferred embodiment specifies accumulator preset (initial offset) rules as follows:

1. input=frame, output=frame, initial offset=0
2. input=TOP, output=frame, initial offset=0
3. input=BOTTOM, output=frame, initial offset=−D/2
4. input=frame, output=TOP, initial offset=0
5. input=frame, output=BOTTOM, initial offset=INC/2
6. input=TOP, output=TOP, initial offset=0
7. input=BOTTOM, output=TOP, initial offset=−D/2
8. input=TOP, output=BOTTOM, initial offset=INC/2
9. input=BOTTOM, output=BOTTOM, initial offset= INC/2−D/2

These offset categories are heuristically illustrated in FIGS. 4a–4e with the vertical direction corresponding to phase.

(f) resample lines again using phase generation by INC; the lines are pipelined with L[k] indicating the kth pipeline entry. The pipeline index is centered at 0 which corresponds to the filter center tap. Of course, the filtering of lines is, in fact, filtering

```
do
{    Get_coef_C( REG[i:j] ); //filter coefficients using middle REG bits
     Lout = C[−n]*L[−n] + . . . +C[0]*L[0] + . . . + C[n]*L[n]; // line
     filtering
     out /= filter_gain;
     NewLine = ((REG+INC)/D) − (REG/D); //test variable for new line
     REG += INC; //update output line phase
     while(NewLine--) input_next_line( ); //new input line(s)
     L[−n] <= . . . <= L[0] <= . . . <= L[n] <= *(line++);
         //add new line plus shift prior lines in pipeline
} while(lines remaining);
```

The input_next_line( ) function inputs a new line in the input pipeline while shifting all of the other lines already in the pipeline:

```
input_next_line( )
{            for( k = −n; k<n; k++) L[k] = L[k+1];
             L[n] = next_Line( );
}
``` where next_Line( ) inputs the next incoming line.

4. Third Preferred Embodiments

The third preferred embodiments uses optionally a simpler bilinear line filtering for decimations greater than 2 to 1 based on the fact that NewLine in the second preferred embodiment always equals at least 2, and a line is not used more than once in a bilinear interpolation. In particular, the bilinear filtering would be:

```
do
{    Get_coef_C( REG[i:j] ); //filter coefficients using middle REG bits
     Lout = C[0]*L[0] + C[1]*L[1]; //bilinear line filtering
     out /= filter_gain;
     SkipLine = ((REG+INC)/D) − (REG/D) − 2; //test variable for line
     skips
     REG += INC; //update output line phase
     while(SkipLine--) line++ ; //skip lines not to be used
     input_next_line(2); //input two new lines for the interpolation
         L[0] <= L[1] <= *(line++);
         L[0] <= L[1] <= *(line++);
             //two new lines in the filter pipeline
} while( output lines remaining);
```

Figure 5:
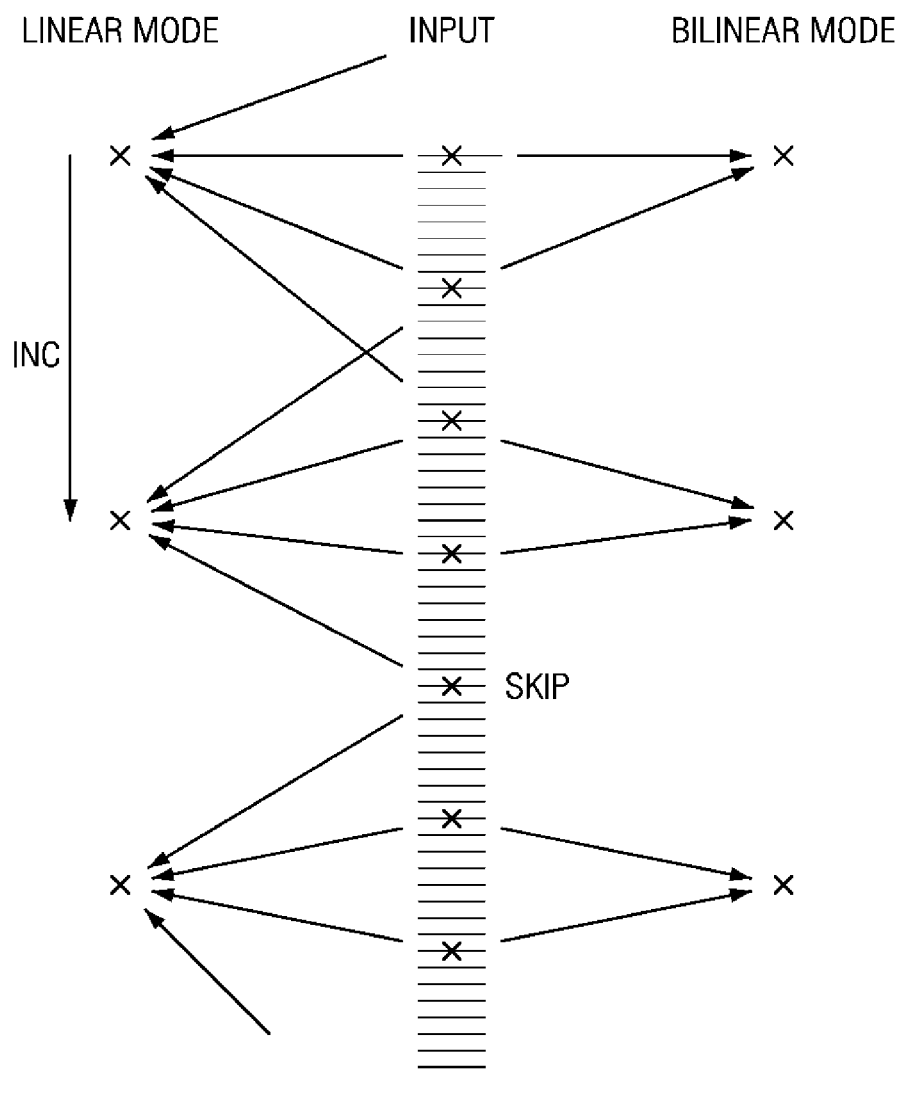
FIG. 5 compares bilinear and linear filterings.

FIG. 5 compares a 4-tap filtering with bilinear filtering.

5. Hybrid Device Preferred Embodiment

Figure 3:
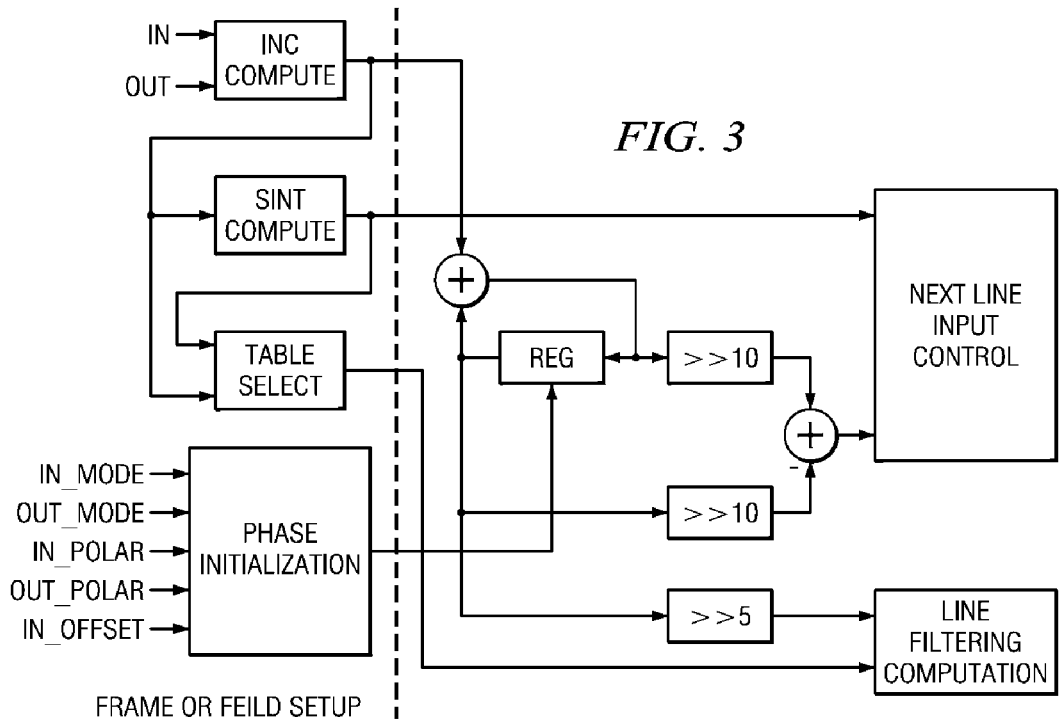
FIG. 3 is a third preferred embodiment.
Figure 4C:
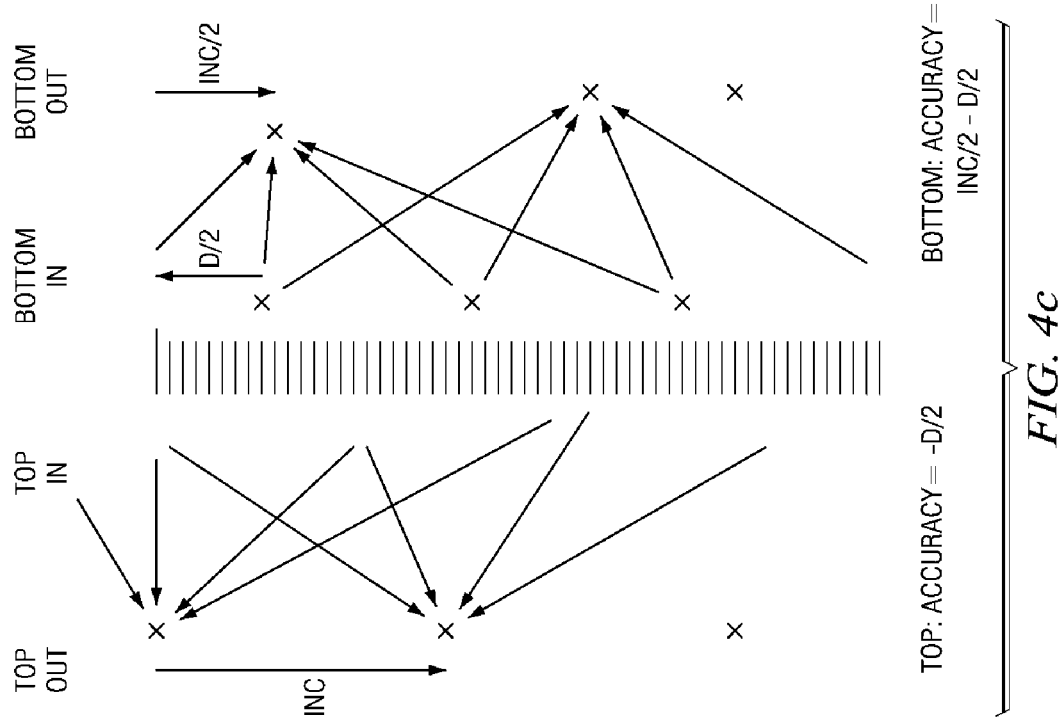
Figure 4B:
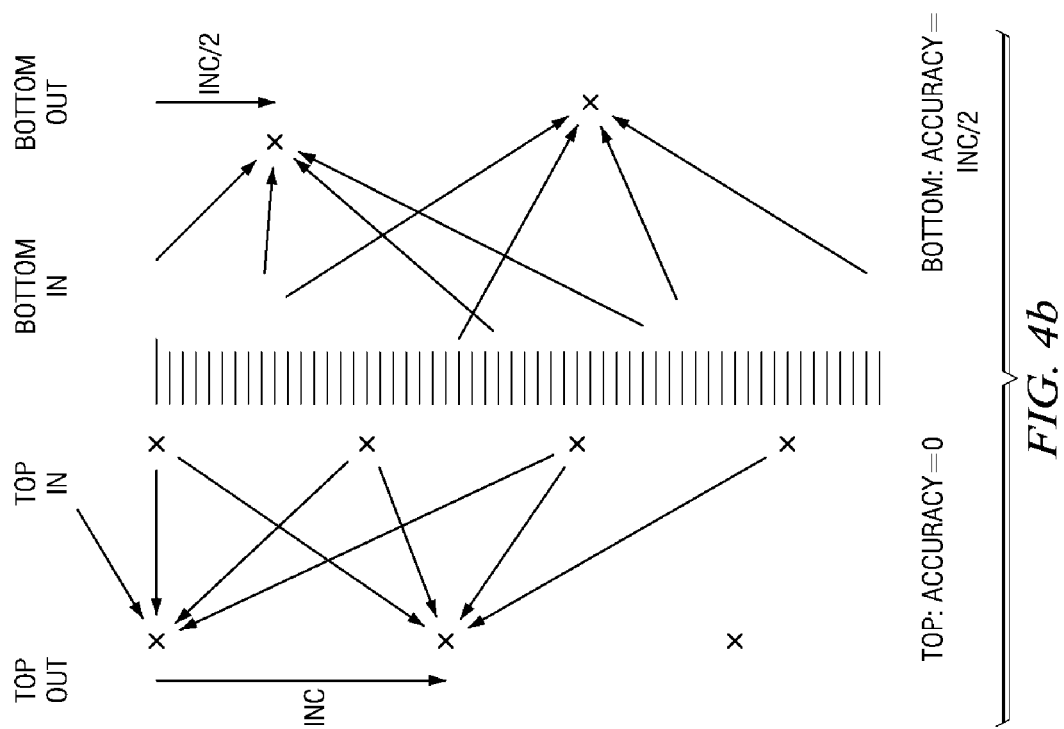
Figure 4E:
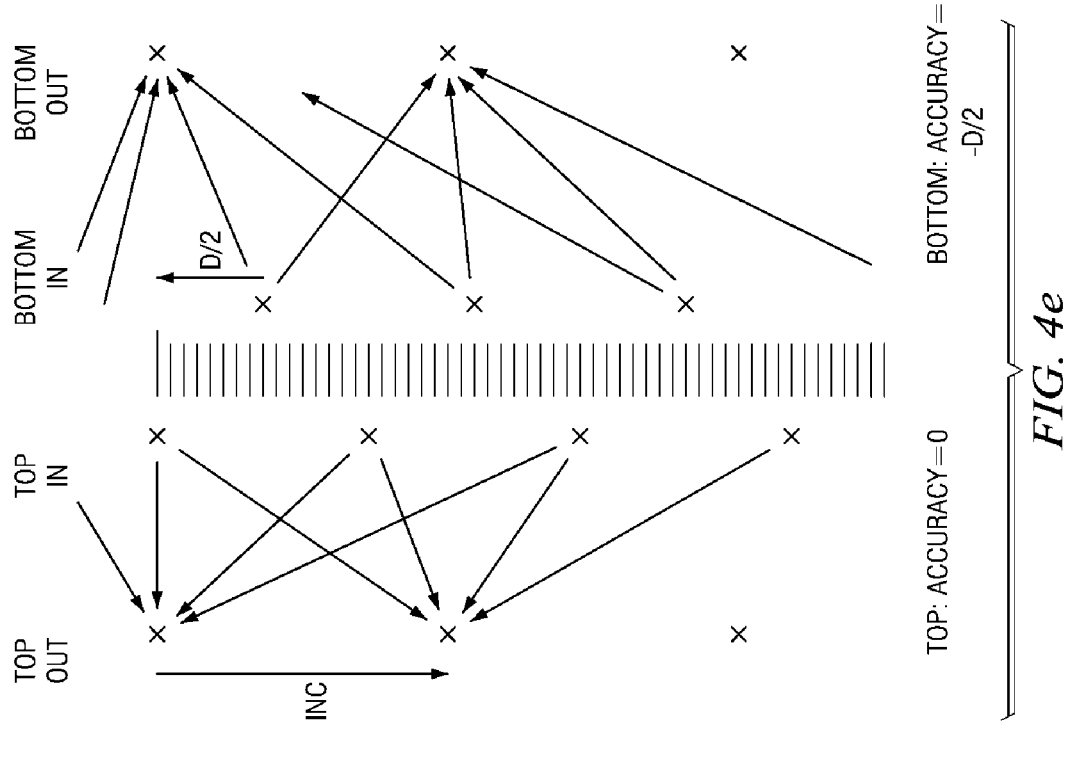
Figure 4D:
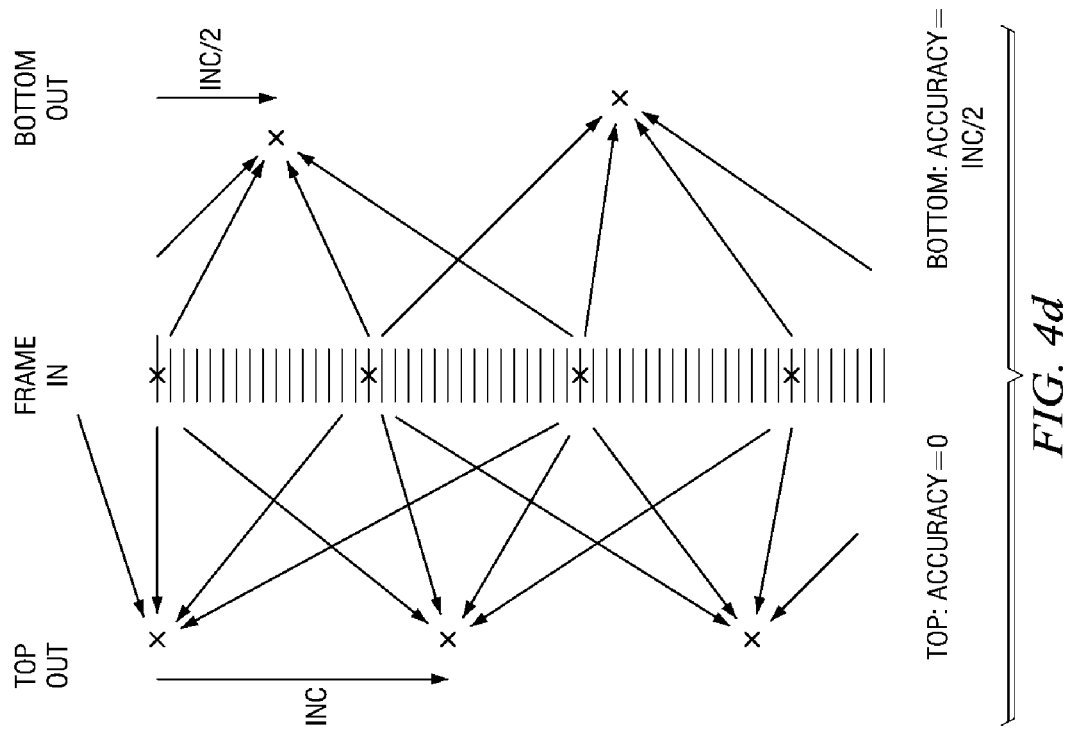

FIG. 3 illustrates a hybrid device operational in various modes. In particular, define a variable SINT (simple interpolation) to apply bilinear interpolation for decimations with resampling ratio greater than 2 to 1:

if (INC>2*D) SINT=1;
else SINT=0;

Then the overall flow for the vertical resampling in the hybrid device is as follows:

```
INC = (IN_SIZE/D + OUT_SIZE/2)/OUT_SIZE; //define output phase step
SINT = (INC < 2*D) ? 1: 0;    //SINT assignment
if (SINT)      table = table_SINT;      //selects bilinear filterings
else           table = table[INC];      //selects larger FIR filterings
REG = OFFSET_RULES[mode] + INITIAL_OFFSET; //phase initialization
do
{    Get_coef_C(REG[i:j]); //filter coefficients by middle REG bits and table
     Lout = C[−n]*L[−n] + . . . + C[0]*L[0] + . . . + C[n]*L[n]; // line filtering
     out /= filter_gain;
     SkipLine = 0;     //loop initialization
     NewLine = (REG + INC)/D − REG/D;
     if(SINT)
     {    SkipLine = NewLine − 2;
          NewLine = 2;
     } while(SkipLine--) skip_line( );
     REG += INC;
} while( output lines remaining);
```

The FIG. 3 block diagram does not show how the lines should be read from memory nor show the filter itself. The IN_MODE is the input field/frame mode indication; OUT_MODE is the output field/frame mode indication; IN_POLAR TOP/BOTTOM field, only valid if IN_MODE is field; OUT_POLAR TOP/BOTTOM field, only valid if OUT_MODE is field; IN_OFFSET is the initial offset phase.

6. Alternative Preferred Embodiments

The foregoing preferred embodiments can include filter response adaptation in the down-sampling modes to avoid aliasing. In particular, the filter response (which set of filter coefficients) derives from the INC (and D) value because INC represents the resampling ratio, both for a row of samples and for a set of lines. Thus, for example, logarithmic response by:

```
Inc = 1024;
table = 0;
while(Inc < INC)
{   table++
    Inc += Inc/4:
}
``` where "table" is a number that indicates the appropriate response curve to be selected.

7. Modifications

The preferred embodiments may be modified in various ways while retaining one or more of the features of an output phase accumulator with bits split into three groups (input sample addressing, filter coefficient selection, and used only to maintain accuracy), For example, the phase between input samples (D) can be taken larger or smaller than 1024, and may depend upon the resolution required; the number of phase bits used as the subpixel phase bits to select filter coefficients can be taken larger or smaller than D/2, for example D/4 or 3*D/4; the sets of filter coefficients could be for filters with more or less than the 2 and 4 taps used for illustration; the output phase could be used for resampling audio or other one-dimensional inputs or three-dimensional or higher arrays such as video sequence files, and so forth.

What is claimed is:

1. A method of sampling rate conversion which uses poly-phase filtering, the improvement comprising:
   (a) generating a phase with a first resolution; and
   (b) selecting poly-phase filters using said phase at a second resolution which is coarser than said first resolution.

2. A method of image resampling which uses horizontal and vertical poly-phase filtering, the improvement comprising:
   (a) generating a phase at a first resolution using input parameters;
   (b) selecting poly-phase filters from said phase for horizontal filtering to output resampled lines, said selecting uses said phase at a second resolution which is coarser than said first resolution, and
   (c) selecting poly-phase filters from said phase for vertical filtering of the resampled lines from step (b) to output a resampled image, said selecting uses said phase at a second resolution which is coarser than said first resolution.

3. The method of claim 2 wherein:
   (a) the image is in a video sequence with interlaced fields or progressive frames; and
   (b) the vertical resampling adjusts among top field, bottom field, and frame by initial phase offsets.

4. An image resampler, comprising:
   (a) a phase generator;
   (b) a filter coefficient memory with address input coupled to a truncated output of said phase generator, said truncated output discarding the least significant bits of a phase generated by phase generator; and
   (c) a filter with an image input and filter coefficients stored in said memory.

5. The resampler of claim 4, wherein:
   (a) said phase generator and said filter are implemented as programs on a programmable processor.

* * * * *